United States Patent Office 3,505,190
Patented Apr. 7, 1970

3,505,190
ETHYLENE:HIGHER-ALPHA-OLEFIN COPOLYMERS COMPATIBLE IN CURE WITH UNSATURATED POLYMERS
Richard T. Morrissey, Cuyahoga Falls, Ohio, assignor to The B. F. Goodrich Company, New York, N.Y., a corporation of New York
No Drawing. Continuation-in-part of application Ser. No. 398,425, Sept. 22, 1964. This application Dec. 27, 1967, Ser. No. 693,724
Int. Cl. C01j *1/10;* C08f *27/02*
U.S. Cl. 204—159.18                    7 Claims

ABSTRACT OF THE DISCLOSURE

Ethylene:higher-alpha-olefin copolymers compatible in cure with unsaturated polymers are prepared by dissolving and subjecting said copolymers to successive steps of halogenation, dehydrohalogenation, rehalogenation and redehydrohalogenation, in the presence of ultraviolet light and dehydrohalogenation catalyst.

CROSS REFERENCE TO RELATED APPLICATIONS

Ser. No. 398,425, filed Sept. 22, 1964, now abandoned of which this application is a continuation-in-part.

BACKGROUND OF THE INVENTION

Rubbery ethylene:propylene copolymers have extremely low unsaturation and will not undergo a sulfur cure. They are highly resistant to ozone, however, and are of further interest to rubber fabricators because of their potentially low cost. Ethylene:propylene copolymers can be brominated, as described in U.S. Patent No. 3,000,867, and they will then undergo a sulfur cure. They can also be chlorinated and partially dehydrochlorinated (in the solid state) as shown in Australian Patent 257,696 and will also then cure with sulfur, but they still will not cure compatibly with natural rubber or other unsaturated rubber in a sulfur cure. It would be very desirable to have these materials cure compatibly with highly unsaturated natural rubber, or diene rubbers in blends such as are desirably made in the preparation of stocks for passenger car tires, truck tires, airplane tires and heavy duty off-the-road tires.

The ethylene:propylene copolymers show great promise for improving ozone resistance, weather resistance, heat resistance, and chemical resistance of articles made therefrom when blended with natural rubber and other unsaturated rubbers, particularly tires which consume more rubber hydrocarbon than any other single product. It seems feasible to make a pneumatic tire of 100% ethylene:propylene copolymer as the rubbery component, but there are problems with hot tear resistance and body tack and the most effective way for the new polymers to enter the tire field is by blending them with natural rubber (NR), styrene:butadiene rubber (SBR) and cis-polybutadiene rubber which are the main rubbery materials used in tire manufacture today. It is also desirable to blend the highly ozone resistant ethylenepropylene copolymers with oil resistant butadiene:acrylonitrile elastomers and obtain compatibly cured stocks. At present this compatibility does not exist. The ethylene:propylene copolymers and halogenated ethylene:propylene copolymers will not co-cure in the sulfur cures with highly unsaturated natural rubber or diene rubbers. Even a very small amount of unsaturated rubber in a batch of the saturated rubbers will completely upset the sulfur cure rate and properties of the batch because the unsaturated rubber (the contaminant) uses up the curing agents and proper cure of the remainder of the batch is not obtained. This means that when one desires to run a batch of ethylene:propylene or halogenated ethylene:propylene copolymer in regular rubber processing equipment, e.g., Banbury mixers and the like, it is necessary to thoroughly clean contaminating stocks from the equipment before and perhaps after the desired batch is run. Such cleanup is time consuming and causes the waste of much high grade stock used in "cleanup batches" which, at best, is downgraded to workaway material or at the worst must be scrapped. This cleanup is expensive and undesirable.

SUMMARY OF THE INVENTION

It has been discovered that ethylene:higher alpha-olefin copolymers in the molecular weight range of 15,000–200,000 can be made compatible in sulfur cure and in resin cure with natural rubber and unsaturated synthetic rubbers by a process which involves dissolving and halogenating the copolymer, then at least partially dehydrohalogenating the said halogenated copolymer, both of which steps are known in the art, and finally re-halogenating the said partially dehydrohalogenated copolymer ending with a second dehydrohalogenation period. The second halogenation-dehydrohalogenation is the key to achieving sulfur cure compatibility. These steps can be performed efficiently and economically in combination on the ethylene:higher alpha-olefin copolymers in the cement stage early in the processing of the copolymers. They are preferably carried out right in the copolymer polymerizer and may be described as wet processing.. It is critical to this invention that ultraviolet light as a halogenation catalyst and a dehydrohalogenation catalyst both be present during the four steps, halogenation, partial dehydrohalogenation, and the newly added steps, the rehalogenation and re-dehydrohalogenation. In the absence of the dehydrohalogenation catalyst, halogenated ethylene:higher alpha-olefin copolymers will be obtained that may undergo sulfur cure to give excellent physical properties themselves, but which will not co-cure compatibly with natural rubber or other unsaturated rubber in sulfur recipes. In the absence of ultraviolet light, the added halogen tends to halogenate the solvent, rather than the polymer. The new compatible polymers prepared by this novel process will co-cure in sulfur curing systems with natural rubber and diene unsaturated rubbers in all proportions, and show improved adhesion to natural rubber over ethylene: propylene unhalogenated copolymers. Also, these new halogenated copolymers respond to phenol dialcohol curing agents in resin cure systems. The dehydrohalogenation catalyst selected must be soluble in the solvent employed to dissolve the copolymer or be miscible therewith.

A combination of halogenation and dehydrohalogenation steps on low molecular weight polyolefin homopolymers and copolymers is shown in the art (U.S. Patent No. 2,850,490). The teaching of the prior art does not lead to the present invention. The prior art deals only with low molecular weight polymers, less than 15,000 molecular weight. Higher molecular weight materials can not be subjected to the prior art process because they will not melt at the temperatures employed and the high temperatures needed to melt them will lead to polymer degradation. Conversely, the low molecular weight materials employed in the prior art, when dissolved in solvent and processed according to the method of the present invention are found to be incapable of producing materials with adequate physical properties and compatibility in sulfur cure with unsaturated elastomers.

The halogen-containing ethylene:propylene copolymers prepared according to the invention may be mixed with natural rubber and diene rubbers in any desired proportions and the resulting mixtures will co-vulcanize in sulfur systems to give elastic products with excellent properties. Mixtures of ethylene:propylene copolymer with small amounts (approximately 10% by weight) of natural rubber cannot be vulcanized to appreciable strength, but similar mixtures containing the new halogenated copolymers have high strength and good properties. Small amounts of halogenated ethylene:propylene copolymer blended with natural rubber greatly improve the ozone resistance, flex resistance, and other properties of the co-vulcanizates whereas unhalogenated ethylene:propylene copolymers used to blend with natural rubber act only as inert fillers and give no significant improvement in properties.

Furthermore, the rubber compounder desires great freedom of choice in selecting the compounding agents, pigments, fillers, tackifiers, vulcanization agents, accelerators, and softeners, that he employs. The current ethylene:propylene copolymers are high Mooney viscosity materials and usually require large amounts of processing oils to make them workable in rubber machinery. In the present polymers the selection of such oils is limited to the more saturated varieties such as paraffin oils and waxes, petrolatum, petroleum waxes, polyisobutylene (Vistanex), and low molecular weight polyethylene. With these new halogenated materials the selection of the type of softener is not limited in this fashion but may include unsaturated softeners such as cotton seed oil, palm oil, peanut oil, oleic acid and pine tar oils.

The new halogen-containing ethylene:higher alpha-olefin copolymers may be prepared by reacting in an organic solvent an ethylene:higher alpha-olefin copolymer with a halogenation agent selected from the group consisting of molecular halogens and organic halogenating materials. Preferred halogens are bromine and chlorine. The halogenated copolymers, still in the cement solution, are next subjected to a dehydrohalogenation step and then to a second or rehalogenation step and final dehydrohalogenation to form the sulfur cure compatible halogenated copolymers of the invention. Final compounding ingredients such as softeners, fillers, and the like easily can be added and thoroughly dispersed in the cement solution before the rehalogenated copolymers are precipitated and dried.

It is believed that the initial halogenation reaction occurs by halogen atoms replacing hydrogen atoms at scattered points along the polymer chain. Some of these halogen for hydrogen substitutions occur at tertiary carbon atoms in the copolymer chain. When the second phase of the process, dehydrohalogenation, is accomplished, hydrogen halide is split out and double bond unsaturation is created in the polymer at some of the chlorination sites. When the rehalogenation is accomplished, halogen adds at some of these newly created double bonds. As further dehydrohalogenation occurs in this sequence of reactions at least some of the halogen atoms remain attached to the polymer chain in positions allylic to the nearest double bond. This sequence of reactions is illustrated by the following equations:

1.

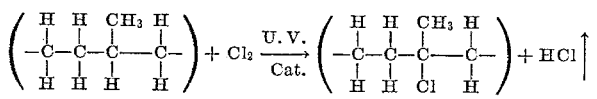

2.

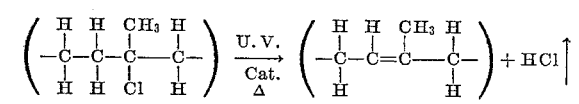

3.

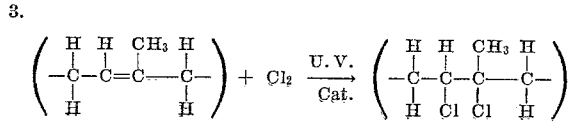

4.

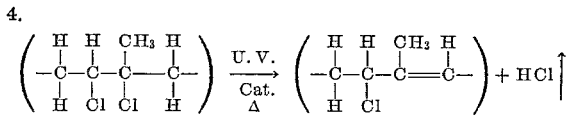

Preferred ethylene:higher alpha-olefin copolymers for use in preparing these new halogenated copolymers contain from 5 to 95 mol percent, preferably 30 to 70 mol percent of ethylene with 95 to 5 mol percent, preferably 70 to 30 mol percent of an alpha-olefin containing 3 to 6 carbon atoms. Molecular weights vary from 15,000 to about 200,000. These copolymers can be prepared by known processes, such as the low pressure polymerization process or the high pressure polymerization process; see e.g. Belgian Patent 533,362, "Chemical and Engineering New," Apr. 8, 1957, pp. 12 through 16, and "Petroleum Refiner," December 1956, pp. 191 through 196. Ethylene:propylene copolymers are preferred because of the availability of the monomers. These amorphous rubbery copolymers do not contain sufficient unsaturation to enable them to be cured by conventional curing agents such as sulfur or resins. Also, these copolymers contain such a slight amount of unsaturation that they cannot be halogenated to any appreciable extent by the addition of halogen across their double bonds. As stated, methods of preparing the copolymers of ethylene and higher alpha-olefins such as propylene are known in the art and do not comprise an essential part of this invention. Such copolymers may be prepared by use of catalysts known as coordination catalysts made from components of two types, first, compounds of transition heavy metals of groups IV, V and VI beginning with titanium, vanadium and chromium, and, second, organometallic compounds, hydrides and free metals of groups I, II and III. Compounds of the first type are preferably halides, oxyhalides and alcoholates, with titanium and vanadium the preferred metals. The metals of the second component are preferably lithium, sodium, magnesium and aluminum and the organic portions are preferably alkyl radicals. In the organometallic compounds the valences of the metal may be partly satisfied by halogen or alkoxyl, if at least one bond connects the metal with an organic radical.

These catalysts must be used in strict absence of water or oxygen and the preferred solvents in which to use them are saturated aliphatic and hydroaromatic hydrocarbons and non-reactive halogen compounds such as tetrachloroethylene. Polymerizations normally are carried out at ordinary temperatures and pressures.

In preparing the halogen-containing derivatives of this invention, the most useful sources of halogen have been found to be molecular halogens of atomic weight 35–80. The halogenation is readily accomplished by preparing a solution, dispersion or cement of the copolymer in an appropriate, normally liquid, organic solvent, adding the halogenating agent and heating to about 75°–85° C. in the presence of ultraviolet light to form the halogenated copolymer in solution or in dispersion. It is known to brominate ethylene:propylene copolymers as shown in U.S. Patent No. 3,000,687. Materials of the type shown in the patent are not, however, compatible with natural rubber in sulfur cure.

The next step is to at least partially dehydrohalogenate the halogenated copolymer. It is not unknown to perform this step. Australian Patent 257,696 describes the chlorination and subsequent dehydrochlorination of rubbery ethylene:propylene copolymers. When the materials described in this patent are prepared, however, although they are found to be curable with sulfur and sulfur-containing materials, they are incompatible when cured in a blend with natural rubber or other unsaturated rubber polymers. The dehydrohalogenation step may be accomplished on solid state halogenated ethylene: higher alpha-olefin copolymers as described in Australian Patent 257,696 or by heating of the copolymer in a press, air oven, or a rubber mill, or in a mixer such as a Banbury machine. The preferred method for this invention is to dehydrohalogenate by heating the halogenated copolymer in the same cement solution it is in when the halogen is added. Temperatures of 70°–85° C. may be employed to drive off the hydrogen halide from the polymer cement in the presence of a dehydrohalogenation catalyst.

The inventive step of the process, with the copolymer preferably still in the cement solution, is to rehalogenate the previously halogenated and partially dehydrohalogenated copolymer followed by a final dehydrohalogenation. The same halogen employed in the first halogenation step or a different one may be used. Iodine monochloride has been found to be effective. The halogen may be added at this point in molecular form or by use of an organic halogenated agent, employing the ultraviolet light, dehydrohalogenation catalyst combination described above.

A unique aspect of the invention is that instead of performing the steps of the process in separate pieces of equipment, as would be required in dry state processing, one can efficiently carry them out in essentially a single operation—separated only by short time intervals—in the polymer polymerizer. Halogen, added with catalyst to the polymerizer after the ethylene:higher alpha-olefin polymer is formed and excess monomers have been removed, enters the copolymer. When the halogenation addition is stopped, hydrogen halide continues to leave the copolymer. A second charge of halogen then enters the copolymer and hydrogen halide continues to separate. The finally precipitated ethylene:olefin copolymer will contain both combined halogen and some double bond unsaturation, and will be compatible in sulfur cure in blends with unsaturated rubber polymers.

While the process of the invention is best illustrated by the individual periods of halogenation and dehydrohalogenation, it has been found possible to produce sulfur cure compatible ethylene-propylene copolymers by lengthening the addition and reaction time of the halogen. Provided that the dehydrohalogenation catalyst is present, the halogenation and dehydrohalogenation reactions tend to proceed concurrently, and in a long enough period, the four individual steps of the process will all occur, producing sulfur cure compatible materials. This effect is illustrated in Example VII.

The compounds suitable as dehydrohalogenation catalysts for the invention are those which can take up one or more electron pairs in an incomplete valency shell of one of their atoms. These include compounds which are considered as electron acceptors. Preferred dehydrohalogenation catalysts include, for example, $AlCl_3$, $FeCl_3$, $FeCl_3 \cdot 6H_2O$, $SbCl_3$, $SbCl_5$, $ZnCl_2$, $ZnCl_4$, $TiCl_4$ and $BF_3$. It is also important that the catalyst selected be soluble or dispersible in the solvent employed to form the polymer cement. If a particular catalyst is not soluble or dispersible in the medium being used, this step may often be accomplished by making a catalyst complex which will be soluble. For example, $AlCl_3$ is not soluble in benzene and will not catalyze the steps of the invention when the process is conducted in that solvent. When complexed with CuCl, however, $AlCl_3$ is soluble in benezene and can be used in that preferred solvent. Alternatively, to use $AlCl_3$ as the catalyst alone, one would have to change to another solvent such as $CCl_4$ which is a solvent for the polymer and the $AlCl_3$. It is within the scope of this invention to use as catalyst $FeCl_2$ or even a metal alone, such as iron filings, Fe. As chlorine is added to the reaction medium, some of it will react with the metal ions, or the lower valent salt to form the higher valent salt, in this case, $FeCl_3$, which is the desired catalyst material. The reaction will then proceed as if $FeCl_3$ had been added initially. From 0.01 to 5.0 parts by weight of dehydrogenation catalyst per 100 parts polymer has been found to be the preferred catalyst range.

The halogen-containing copolymers of this invention may be blended in all proportions with unsaturated rubbery elastomers including natural rubber, styrene-butadiene rubber, acrylonitrile - butadiene rubber, cis - polybutadiene and cis-polyisoprene and satisfactorily co-cured in sulfur curing systems. The batches are compounded on rubber mills or in Banburys with sulfur, accelerators, reinforcing agents, fibers, plasticizers, softeners and the like. Cures at 250° F. to 350° F. for ¼ to 2 hours are generally sufficient to develop stocks with excellent stress-strain properties. Typically, for 70 parts of halogenated copolymer and 30 parts of unsaturated rubber, equal to 100 parts of elastomer, from 25 to 60 parts of carbon black, 2 to 50 parts zinc oxide, 0.5 to 3 parts stearic acid, 0.1 to 1.0 parts mercaptobenzothiazole, 0.5 to 2.0 parts tetramethyl thiuram disulfide and 1.0 to 4.0 parts of sulfur are employed. Alternate reinforcing agents, lubricants, plasticizers, softeners, extenders, accelerators and retarders may also be employed as known to those skilled in the art. Procedures and modifications of sulfur curing are also described in Encyclopedia of Chemical Technology, Kirk and Othmer, Interscience Encyclopedia, Inc., (1953, vol. II, pp. 892–927).

The properties of the halogen-containing polymers of this invention are unusual. The halogenated derivatives of the solid plastic rubbery materials are themselves solid plastic rubbery materials which possess the advantages of the parent unhalogenated materials and are superior in adhesion, ease of vulcanization, and various properties of the vulcanizates. They may be used for all the purposes for which the unhalogenated rubbery polymers are useful alone, as, for example, the manufacture of tires, belts, hose and the like and they may be used for various purposes of particular importance in blends of natural rubber and diene rubbers in the manufacture of tires and other rubber products in which the unhalogenated materials are unsatisfactory because of incompatibility. They are useful as adhesives to bond rubbery materials and may be advantageously used in vulcanizable mixtures in any proportions with natural rubber and diene synthetic rubbers, imparting the desired properties of increased ozone resistance and improved resistance to flexing to the resulting vulcanizates.

They may be compounded with conventional ingredients used in compounding unhalogenated ethylene: propylene copolymers.

In addition, these new halogenated copolymers are found to respond to phenol dialcohols and their halogenated derivatives as curing agents in a resin cure system.

These resin cured stocks are very heat resistant in addition to having excellent resistance to ozone and weathering and they are useful for fabrication into curing bags and diaphragms for tire manufacture and into other articles whose resistance to heat in use is of major concern.

The process of this invention has been found to provide compatibility in sulfur cure between unsaturated elastomers and a wide variety of ethylene-propylene copolymers, but the improvement holds true only when the molecular weight of the ethylene-propylene copolymer is in excess of about 15,000. Copolymers with lower molecular weights are found to be weak in sulfur cure, both alone and in blends with unsaturated elastomers. Low molecular weight homopolymers of ethylene and propylene also are found to be incompatible in sulfur cure with unsaturated elastomers when processed according to the method of this invention. It is possible that when the polymer molecular weights are too low, the polymer is actually degraded by the initial attack of halogen and the later modification steps of dehydrohalogenation, rehalogenation and redehydrohalogenation can do nothing to improve its condition.

Polymer molecular weights greater than 15,000, preferably 100,000 to 500,000 are preferred for the practice of this invention.

The preparation, properties, compounding, vulcanization and use of the halogenated ethylene:propylene copolymers in this invention are more fully set forth in the following examples which are illustrative only. In the examples all parts are by weight.

DETAILED DESCRIPTION OF THE INVENTION

Example I

An ethylene-propylene copolymer, 43 weight percent ethylene, having an ML value at 212° F. of 40, crystallinity of 0 percent, and intrinsic viscosity of 2.2, is dissolved in benzene to give a 5% solid solution.

Sufficient polymer solution to contain 100 grams of polymer is placed in a 5 liter resin flask stirred with a glass agitator, and heated by an electric mantle to 75°–80° C. The mantle is then replaced by an ultraviolet light (a 275 RS sun lamp). Gaseous chlorine, measured by a flowmeter, is added below the surface of the polymer cement at a rate to pass 9 grams of chlorine into the cement over a period of 11 minutes. Vapors swept through are condensed and collected in a trap bottle containing a known amount of sodium hydroxide. The halogenated polymer cement is sampled for chlorine analysis, then poured into alcohol to precipitate the polymer as crumb which is filtered and dried 18 hours at 50° C. under vacuum. The polymer is combined with natural rubber and compounding materials by standard mill mixing techniques in the following recipe:

| Material: | Parts |
| --- | --- |
| Chlorinated polymer (6.7% Cl) | 90.0 |
| Natural rubber | 10.0 |
| Carbon black (HAF) | 40.0 |
| Zinc oxide | 5.0 |
| Stearic acid | 1.0 |
| Mercaptobenzothiazole | 0.5 |
| Tetramethyl thiuram disulfide | 0.5 |
| Sulfur | 1.5 |

The compound is sheeted to 6" x 6" x 0.25" dimensions and press cured for 45 minutes at 307° F. The polymer blend has a tensile of 250 p.s.i. and elongation of 200%. The chlorinated polymer alone has a tensile of 2350 p.s.i. Natural rubber alone has a tensile of 3500 p.s.i. The materials are not compatible in sulfur cure. For the polymers to be judged compatible, the blend tensile strength should be 1500 p.s.i. or more.

Example II

The polymer and procedure of Example I are employed except that following the 11 minute chlorination step, a dehydrochlorination period of 35 minutes is added with the temperature held at 80° C. throughout. Compounded and cured as in Example I, this polymer, containing 6.9% Cl, forms a blend with tensile of 850 p.s.i., elongation of 535% and 300% modulus of 500 p.s.i. It is not sulfur cure compatible.

Example III

Example II procedure is followed except that 0.1 grams of FeCl$_3$·6H$_2$O, a dehydrochlorination catalyst, are added to the polymer cement before halogenation starts. When blended and cured as in Example I, the polymer blend has 1050 p.s.i. tensile, 475% elongation, and 610 p.s.i., 300% modulus. The chlorinated polymer analyzes 3.5% Cl.

Comparing Example II and Example III it is seen that the presence of the dehydrogenation catalyst has resulted in improved sulfur cure compatibility, but it is still not very satisfactory.

Example IV

The polymer and procedure of Example I are employed with 0.075 grams of FeCl$_3$·6H$_2$O present during the chlorination. After the chlorine is shut off, a dehydrochlorination period of 20 minutes is allowed. During this time, dehydrochlorination becomes the dominant reaction. For the final 10 minutes of this period, air is blown through the system to sweep out unreacted gases and hydrogen chloride. These vapors are collected in a trap bottle containing a known amount of sodium hydroxide.

Next, a further addition of 0.025 grams FeCl$_3$·6H$_2$O is made. After 2 minutes, chlorine is again added at the rate of 9 grams over 11 minutes. A final 20 minute period, with an air sweep being employed during the last 10 minutes, is allowed for completion of the rechlorination and continuing dehydrochlorination. This polymer analyzes 5.4% chlorine and in the cured blend has a tensile of 2000 p.s.i., elongation of 425% and 1175 300% modulus. It is completely sulfur cure compatible.

Example V

The polymer of Example I and the procedure of Example IV are employed, except that in the second halogenation period, bromine is substituted for chlorine.

Example VI

The polymer of Example I is used with 0.1 gram of FeCl$_3$·6H$_2$O added initially and 18 grams of chlorine added in a single addition of 22 minutes followed by a 40 minute dehydrochlorination period.

Example VII

The polymer of Example I is used as in Example VI, but the 18 grams of chlorine are added over a period of 60 minutes followed by a ten minute dehydrochlorination period.

Example VIII

The polymer of Example I and the procedure of Example IV are employed except that no dehydrochlorination catalyst is used in either chlorination step.

Data for Examples V–VIII are set forth in Table 1.

TABLE 1

| | Example | | | |
| --- | --- | --- | --- | --- |
| | V | VI | VII | VIII |
| Catalyst | (1) | (1) | (1) | None |
| Percent Cl | 3.8 | 5.3 | 4.7 | 6.8 |
| Percent Br | 3.3 | | | |
| Percent HCl in trap bottle | | 5.4 | 5.99 | 6.7 |
| Treated copolymer alone: | | | | |
| 300% M, p.s.i. | 1,300 | 1,000 | 1,000 | 1,100 |
| Tensile, p.s.i. | 2,850 | 2,900 | 2,450 | 2,875 |
| Elong., percent | 485 | 535 | 500 | 565 |
| 90/10 blend with NR: | | | | |
| 300% M, p.s.i. | 1,100 | 800 | 1,050 | 500 |
| Tensile, p.s.i. | 2,100 | 1,850 | 1,900 | 800 |
| Elong., percent | 425 | 510 | 435 | 550 |

$^1$ .075 g. FeCl$_3$·6H$_2$O plus .025 g. FeCl$_3$·6H$_2$O.

The data in Table 1 indicate that halogen is added to the ethylene:propylene copolymer in each of the halogenation steps in the process of the invention (Example V). The excess of percent HCl over percent Cl in Example VII indicates that dehydrochlorination has taken place. The near equality of percent HCl and percent Cl in Example VI indicates that very little dehydrochlorination has occurred. Examples VI and VII show that a longer reaction period does favor ultimate dehydrochlorination and increasing sulfur cure compatibility, but the time needed in Example VIII is greater than that employed in the preferred method of the invention as shown in Example IV, where excellent sulfur cure compatibility is obtained. The polymers of Examples VI and VII are also much poorer in hysteresis than the polymer of Example IV. Goodrich Flexometer temperature rises for the three polymers are 80° (blew out), 82°, and 66° respectively. Example VIII shows that when no dehydrochlorination catalyst is used, one still achieves chlorination of the ethylene-propylene polymer, but sulfur cure compatibility is nil.

Examples IX–XVI

For this series of examples, the polymer of Example I and the procedure of Example IV are employed, substituting other dehydrochlorination catalysts for $FeCl_3 \cdot 6H_2O$.

Data are set forth in Table 2.

When the procedure of Example IV is repeated with another ethylene-propylene copolymer, one analyzing 52.5 mol percent ethylene, having an ML value at 2.2° F. of 60, and intrinsic viscosity measured by dissolving 0.2 g. per 100 ml. of toluene at 25° C., of 2.11, made in benzene using vanadium oxychloride: diethyl aluminum chloride catalyst, substantially similar results are obtained, indicating that the method of the invention will make a variety of ethylene-propylene copolymers sulfur cure compatible with unsaturated polymer.

over a period of 4 hours. After chlorination, the temperature is raised slowly to 280° C. and held 8 hours.

The treated polymer analyzes 5.0 percent by weight chlorine and has an iodine number of 62.7. It is compounded as follows:

TABLE 4

| Material: | Parts |
|---|---|
| Treated polyethylene | 100 |
| Carbon black | 50 |
| Stearic acid | 2.0 |
| Zinc oxide | 5.0 |
| Monobenzylether of hydroquinone | 1.0 |
| Zinc dimethyldithiocarbamate | 1.0 |
| Sulfur | 2.0 |

The material cures but is very weak by commercial standards. A 45' cure at 300° F. develops 900 p.s.i. tensile

TABLE 2

|  | Example | | | | | | | |
|---|---|---|---|---|---|---|---|---|
|  | IX | X | XI | XII | XIII | XIV | XV | XVI |
| Amount of catalyst, grams | None | (1) | (2) | (3) | (4) | (5) | (6) | (7) |
| Percent Cl | 7.0 | 5.1 | 5.0 | 6.8 | 6.6 | 5.6 | 5.9 | 5.6 |
| Copolymer alone: | | | | | | | | |
| 300% M | 900 | 1,350 | 1,225 | 1,135 | 900 | 900 | 1,275 | 810 |
| Tensile, p.s.i | 2,350 | 3,175 | 3,200 | 2,550 | 2,300 | 2,725 | 2,300 | 2,675 |
| Elong., percent | 525 | 525 | 525 | 535 | 560 | 585 | 435 | 675 |
| 90/10 blend with NR: | | | | | | | | |
| 300% M | 325 | 1,000 | 1,100 | 500 |  | 500 | 900 | 750 |
| Tensile, p.s.i | 500 | 2,000 | 2,100 | 900 | 225 | 1,600 | 2,125 | 1,525 |
| Elong., percent | 485 | 510 | 485 | 510 | 285 | 665 | 550 | 610 |
| Remarks | (8) | (9) | (9) | (8) | (8) | (9) | (9) | (9) |

1 1.2 $SnCl_2 \cdot 2H_2O$.
2 0.5 $TiCl_4$.
3 0.5 CuCl.
4 .1 $AlCl_3$.
5 9. Complex CuCl.AlCl.
6 1.8 $SbCl_5$.
7 .1 $VOCl_3$.
8 Incompat.
9 Compat.

Example XVII

A copolymer of ethylene-propylene, 46 weight percent propylene, dilute solution viscosity .582 measured in toluene at 30° C., molecular weight 13,500 is a solid. Between 180° and 185° C. the polymer is in a fluid state and 59 g. of chlorine are passed into 300 g. of polymer over a 2 hour period in the presence of ultraviolet radiation obtained from a 275 RS sun lamp. After chlorination, the temperature is raised gradually to 250° C. and held for 2 hours to carry out dehydrochlorination as shown in the art. The product has 2.6% chlorine, iodine number 18.8 and DSV 0.689. It is compounded as follows:

TABLE 3

| Material: | Parts |
|---|---|
| Chlorinated-dehydrochlorinated polymer | 100 |
| Carbon black | 50 |
| Stearic acid | 2.0 |
| Zinc oxide | 5.0 |
| Monobenzylether of hydroquinone | 1.0 |
| Mercaptobenzothiazole | 0.5 |
| Tetramethylthiuram monosulfide | 1.5 |
| Sulfur | 1.5 |

Cured 45' at 300° F., this material has a tensile strength of only 475 p.s.i., and elongation of 100%. When 90 parts of the treated copolymer is blended with 10 parts natural rubber and compounded as the 100 parts polymer of Table 3, the sample, cured 45' at 300° F. has only 200 p.s.i. tensile strength and elongation of 65%.

Low molecular weight ethylene-propylene copolymers are not made compatible in cure with unsaturated natural rubber by chlorination-dehydrochlorination techniques known in the art.

Example XVIII

A polyethylene of 7000 molecular weight is chlorinated and dehydrochlorinated in the procedure of the prior art as shown in Example XVII. The chlorination is conducted at 167° C. and 135 g. chlorine is added to 300 g. polymer strength at 50% elongation. When 10 parts natural rubber is mixed with 90 parts treated polyethylene, the tensile strength drops to 700 p.s.i. at 50% elongation. Prior art procedures employed with low molecular weight polyolefins do not yield materials compatible in sulfur cure with natural rubber.

Example XVIX

The polyethylene of 7000 molecular weight is treated according to the process of the present invention by dissolving it in benzene and employing $FeCl_3 \cdot 6H_2O$ as the dehydrochlorination catalyst. The procedure of Example IV is used.

The treated polymer compounded with only carbon black develops a tensile of 1125 p.s.i. at 25% elongation after 45' cure at 300° F. When fully compounded the tensile is 1100 p.s.i. at 25% elongation, and when 90 parts treated polymer is mixed with 10 parts natural rubber and the blend is fully compounded, the tensile at 45' and 300° F. is 1100 p.s.i. at 25 percent elongation. The treated polymer does not lose strength when blended with natural rubber, but it has gained no strength even when compounded, so we cannot say that it is compatible with natural rubber in sulfur cure. Also, the minimum goal for compatibility of 1500 p.s.i. set out in Example I has not been achieved.

What I claim is:

1. The method of preparing ethylene:higher alpha-olefin containing 3 to 6 carbon atoms copolymers in the molecular weight range 15,000–500,000 compatible in sulfur cure with unsaturated rubbers comprising forming a cement of said copolymer in an organic solvent, halogenating said copolymer, at least partially dehydrohalogenating said copolymer, rehalogenating said copolymer, and, finally, redehydrohalogenating said copolymer, all of said halogenation and dehydrohalogenation steps being made in the presence of ultraviolet radiation and of a dehydrohalogenation catalyst selected from the group consisting of $FeCl_3$, $FeCl_3 \cdot 6H_2O$, $SbCl_3$, $SbCl_5$, $ZnCl_2$, $SnCl_4$, $TiCl_4$, $BF_3$, $AlCl_3$, and mixtures thereof.

2. The method of preparing high molecular weight unsaturated polymers compatible in sulfur cure with unsaturated rubbers by starting with a saturated copolymer of ethylene and propylene dissolved in a solvent therefor and introducing unsaturation into said saturated copolymer by halogenating said copolymer, partially dehydrohalogenating said copolymer, rehaloienating said copolymer and, finally, redehydrohalogenating said copolymer, each of said halogenations and dehydrohalogenations being conducted in the presence of ultraviolet radiation and a dehydrohalogenation catalyst selected from the group consisting of $FeCl_3$, $FeCl_3 \cdot 6H_2O$, $SbCl_3$, $SbCl_5$, $ZnCl_2$, $SnCl_4$, $TiCl_4$, $BF_3$, $AlCl_3$, and mixtures thereof.

3. The method of claim 2 wherein the said saturated polymer is dissolved in benzene.

4. The method of claim 2 wherein the amount of said dehydrogenation catalyst is 0.01 to 5.0% by weight of said saturated copolymer.

5. The method of claim 2 wherein the halogenation, dehydrohalogenation and rehalogenation of the said saturated polymer are conducted at 75° C.–85° C.

6. An unsaturated copolymer of ethylene-propylene, molecular weight 15,000–500,000, which is compatible in sulfur cure with unsaturated polymers, said unsaturation being produced by forming a cement of said ethylene-propylene copolymer, halogenating said copolymer, dehydrohalogenating said copolymer, rehalogenating said copolymer and redehydrohalogenating said copolymer, all of said halogenation and dehydrohalogenation steps being performed at 75°–85° C. in the presence of both ultraviolet radiation and a dehydrogenation catalyst.

7. The method of preparing ethylene:higher alpha-olefin containing 3 to 6 carbon atoms copolymers of molecular weight 15,000–500,000 compatible in sulfur cure with unsaturated rubbers comprising forming a cement of said copolymer in an organic solvent and then (1) halogenating said copolymer, (2) shutting off the supply of halogen and conducting a partial dehydrohalogenation of the product of step (1), (3) restarting the supply of halogen to further halogenate the product formed through step (2) and (4) shutting off the supply of halogen provided in step (3) and conducting a further dehydrohalogenation, all of said halogenation and dehydrohalogenation steps being conducted at 75°–85° C. in the presence of both ultraviolet radiation and a dehydrohalogenation catalyst selected from the group consisting of $FeCl_3$, $FeCl_3 \cdot 6H_2O$, $SbCl_3$, $SbCl_5$, $ZnCl_2$, $SnCl_4$, $TiCl_4$, $BF_3$, $AlCl_3$ and mixtures thereof.

References Cited

FOREIGN PATENTS

| | | |
|---|---|---|
| 257,696 | 9/1962 | Australia. |
| 872,036 | 7/1961 | Great Britain. |
| 669,259 | 8/1963 | Canada. |

SAMUEL H. BLECH, Primary Examiner

R. B. TURER, Assistant Examiner

U.S. Cl. X.R.

204—159.2; 260—4, 88.2, 889

167103

PO-1050
(5/69)

UNITED STATES PATENT OFFICE
CERTIFICATE OF CORRECTION

Patent No. 3,505,190          Dated April 7, 1970

Inventor(s) Richard T. Morrissey

It is certified that error appears in the above-identified patent and that said Letters Patent are hereby corrected as shown below:

Column 7, line 37, "0.25" should read --0.025--.

Column 9, line 32, "9.0" should read --.9--.

Column 11, line 7, "rehaloienating" should read --rehalogenating--.

SIGNED AND
SEALED

SEP 29 1970

(SEAL)
Attest:

Edward M. Fletcher, Jr.
Attesting Officer

WILLIAM E. SCHUYLER, JR.
Commissioner of Patents